June 7, 1932.  L. E. LA BRIE  1,862,313
VEHICLE WHEEL
Original Filed Nov. 30, 1923
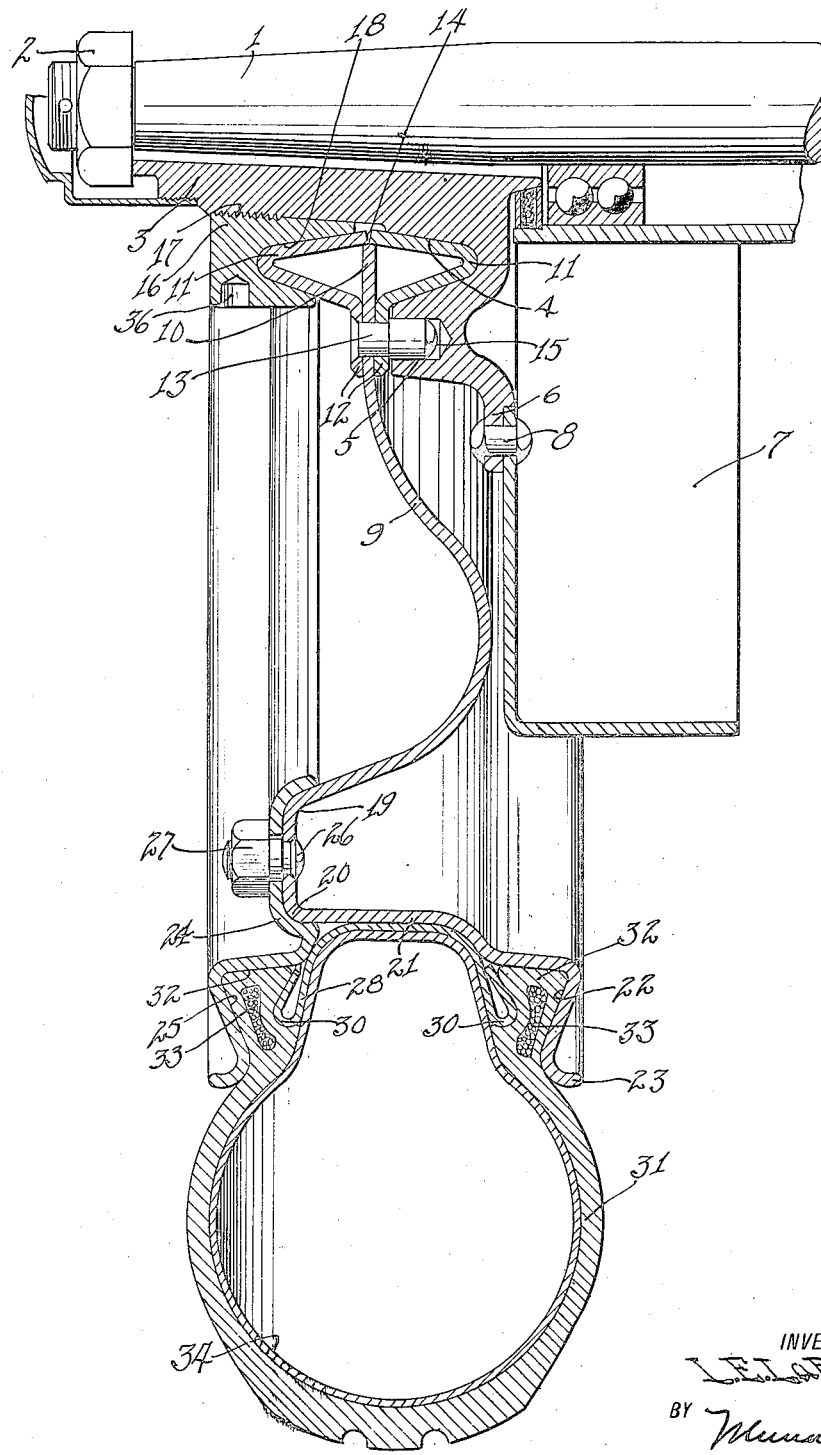
INVENTOR
L. E. LaBrie
BY
ATTORNEYS Patented June 7, 1932

1,862,313

UNITED STATES PATENT OFFICE

LUDGER ELIZE LA BRIE, OF CHICAGO, ILLINOIS, ASSIGNOR, BY MESNE ASSIGNMENTS, TO BENDIX BRAKE COMPANY, OF CHICAGO, ILLINOIS, A CORPORATION OF ILLINOIS

VEHICLE WHEEL

Application filed November 30, 1923, Serial No. 677,809. Renewed August 22, 1925.

My invention relates to improvements in vehicle wheels, and it consists in the combinations, constructions, and arrangements herein described and claimed.

An object of my invention is to provide a vehicle wheel which is an improvement over the vehicle wheel disclosed in my copending application for patent on vehicle wheel, Serial No. 668,709, filed Oct. 15, 1923, in which I disclosed a vehicle wheel of the disk type, in which means is provided for supporting a pneumatic tire thereupon, having an inner tube, the cubical capacity of which is greater than that of the outer casing. My present invention relates largely to a novel means for securing this casing in place.

A further object of my invention is to provide a vehicle wheel of the character described, in which means is provided for preventing the dislodgment of the tire casing from the rim when the tire becomes deflated, as from a blow-out or puncture at the time the wheel is in motion. This particular mechanism I deem the most important element of my invention.

A further object of my invention is to provide a vehicle wheel of the character described, in which a retaining ring for holding the casing in place upon the rim of the wheel is so constructed as to prevent the transmission of shocks and strains, by virtue of the traction of the wheel on the ground, to the retaining studs holding the retaining ring in place.

A further object of my invention is to provide a vehicle wheel of the character described, in which the major portion of the wheel is particularly well adapted to the present day metal drawing process.

A further object of my invention is to provide a vehicle wheel of the character described, which is so constructed as to permit the quick removal of the wheel from its hub portion by the mere loosening and removal of a single king nut.

A further object of my invention is to provide a vehicle wheel of the character described, which is extremely simple in construction, is durable, is neat in appearance, and is thoroughly practical commercially.

Other objects and advantages will appear in the following specification, and the novel features of the invention will be particularly pointed out in the appended claims.

My invention is illustrated in the accompanying drawing, forming part of this application, in which The figure is a sectional view of an embodiment of my invention.

In carrying out my invention, I make use of the ordinary type of vehicle wheel axle 1, having a nut 2 thereupon, by means of which a hub 3, which is rotatably mounted upon the axle 1, is retained against lateral movement, and consequently dislodgement from the axle 1.

The hub 3 is provided with a V-shaped depression 4 on its outermost side wall, and a plurality of depressions 5 arranged in annular alinement and concentric with the annular V-shaped depression 4. An outwardly extending radial flange 6 is formed on the hub portion 3, by means of which a brake drum 7 is supported concentric with the axle 1, by means of rivets 8 projected through the brake member 7 and the flange 6.

My improved vehicle wheel consists in a metal disk 9 of a substantially resilient and durable metal, such as any high quality of steel, fashioned in the manner shown in the drawing, so that its inner portion is in substantially vertical alinement, as shown at 10, when the wheel is erect. A pair of annular cooperating members 11 are disposed one on either side of the innermost portion 10 of the disk 9. These annular members 11 are substantially V-shaped in cross section, and have outwardly extending flange portions 12, by means of which the members 11 are secured to the disk 9 by the use of rivets 13 projected through the portions 12 and the disk 9. The members 11 are welded to the disk 9, as shown at innermost portion of the disk 9, as shown at 14, and to one another. The rivets 13 are each provided with an inwardly extending stud portion 15, which are arranged to enter the depressions 5 in the hub, and therefore prevent rotation of the disk 9 relative to the hub.

Means for securely locking the disk 9 to the hub 3 is provided in a locking ring 16, which is provided with threads in the interior walls thereof which are arranged to engage with threads on the exterior walls 3, as shown at 17. The locking ring 16 has an annular recess 18 in its innermost side walls, substantially V-shaped in cross section and arranged to conform to the outer contour of the adjacent member 11. It should be noted at this time that the depression 4 in the outermost wall of the hub 3 is arranged to conform with the contour of the outer wall of the adjacent member 11.

The disk 9 is bent laterally adjacent its outermost end at 19 and 20, so that a portion 21 of the disk is in substantially horizontal alinement when the major portion of the disk is in vertical alinement, i. e., at the time the wheel is erect. The inner end of the horizontal portion 21 of the disk is bent upwardly at 21' and then laterally, so as to form a trough 22 substantially V-shaped in cross section, and disposed in the position shown in the figure. The extreme outer end of the disk is curved outwardly at 23, so as to lie free of the side walls of the pneumatic casing disposed upon the rim formed by the portion 21 of the disk 9.

The retaining ring 24 is provided, and has a trough-shaped portion 25 corresponding to the portion 22 of the disk 9, and is arranged to be removably attached to the disk 9 by means of bolts 26, secured to the disk 9, and nuts 27 for the bolts 26. The ring, as clearly disclosed in the drawing, is preferably extended inwardly at an angle to the wheel plane to form, with the laterally and outwardly extending portions 21 and 22 of the disk body, a channel within which the enlarged inner tube nests, as hereinafter described. The ring 24 is thence curved laterally outward, seating upon the outer peripheral portion 21 of the disk body at 20, and thence curved downwardly alongside the disk body, as disclosed. The normal load thrusts of the wheel are thus taken direct by the disk body at 20, relieving the ring fastening means 26 of shearing stresses. The rim, defined by the disk flange and locking ring, is of the "drop center" or channel type to accommodate the enlarged inner tube.

An inner or auxiliary rim 28 is disposed concentric with the rim portion 21 of the disk 9, and has its opposite side walls 30 rolled outwardly in the manner shown in the drawing, so as to obviate sharp edges. This auxiliary rim 28 is narrower than the casing supporting rim, which is formed by the rim portion 21 and the retaining ring 24, so that there is a space between the rim 28 and the rim 21—24. This space is greater in width at the inner end than at the outer end. It should be noted at this time that the auxiliary rim 28 may be constructed as one or a plurality of parts. In the present instance, I have shown the rim 28 as a single part, and not constructed in segments.

The pneumatic tire casing 31 is provided, and the lower portion of the side walls 32 is fashioned to conform with the space between the auxiliary rim 28 and the rim 21—24. This portion or bead of the casing 31 is also provided with a cable insert 33 to prevent stretching of the casing at its innermost end.

An inner tube 34 is provided, having greater cubical contents than the casing 31. This tube 34 is permitted to extend down in the rim 28, while the casing 31 only extends into that portion of the rim occupied by the trough portions 22 and 25 on one side, and the rolled portions 30 of the rim 28 on the opposite side. It will be noted at this time that in order to remove the casing 31 from the rim 21—24, it is only necessary to remove the retaining ring 24.

From the foregoing description of the various parts of the device, the operation thereof may be readily understood. Let us assume that it is desired to remove my improved vehicle wheel from its axle and place another wheel in its stead. In this event, it is merely necessary to unfasten the locking ring 16, which may be done by the use of a spanner wrench which is arranged to engage with an opening 36 in the side wall of the ring, and to move the entire disk 9 laterally from engagement with the hub 3. A new wheel may be placed upon the hub 3 and locked in place by means of the locking ring 16. From inspection of the drawing, it will be noted that the tighter the ring 16 is turned, the more rigid the disk 9 is held upon the hub.

Let us assume now that it is necessary to remove the casing 31 and the inner tube 34. This is done by removing the nuts 27 from the bolts 26, and moving the retaining ring 24 from engagement with the disc 9. It is then a simple matter to shift the entire casing 31, with its inner tube 34 and the auxiliary rim 28, from the rim portion 21 of the disk. In this manner the tube may be easily moved out of engagement with the casing, and a new tube substituted therefor, if necessary. In replacing the casing 31, the insert 33, together with the tube 34 and the rim 28, is moved laterally upon the rim portion 21, so that the innermost bead 32 will lie in the portion 22. The retaining ring 24 is then clamped in place by means of the bolts 26—27.

If, in any event, the inner tube 34 should become punctured while the motor vehicle, upon which the wheel is used, is in motion, there is no danger of the casing 31 becoming dislodged from its supporting rim 21—24, since the beads 32 are virtually locked between the rim 21—24 and the auxiliary rim 28 in such a manner as to prevent any outward movement of the casing 31, even though all the air in the tube 34 be expelled. It will be noted that in my improved vehicle wheel, I retain the important feature embodied in the use of an enlarged inner tube having a greater cubical content than a conventional tube, thus permitting low air pressure and greater cushioning effect. The use of such a tube is made possible by my novel two-part deep channeled rim and in this connection it may be noted that, with the supplemental rim omitted, my rim, by virtue of its channel, facilitates both mounting and removal of the tire, should it be desired to remove the same without removal of the locking ring.

While I have shown and described one specific embodiment of my invention, it is to be understood that the same is not to be necessarily limited thereto, but only so far as may be defined in the claims appended hereto.

I claim:

1. In a vehicle wheel, a pneumatic tire casing, an inflatable tube therefor, a rim provided with a medial tube-receiving depression and further provided with tire engaging flanges, said rim adapted to support said tire, and a supplemental rim nesting within said depression provided at its edges with outwardly extending return bent bead engaging flanges spaced from said rim flanges, said supplemental rim adapted to retain said casing in substantially locked engagement with said channeled rim and flanges.

2. In combination, a two part drop center tire supporting rim including bead members constituting side portions of the rim, and a ring of channeled cross section adapted to fit closely within the drop center portion of the rim with the open part of the channel facing radially outward, the sides of said channel extending radially beyond the confines of the drop center portion and being spaced from and in non-parallel relationship to the sides of said rim.

LUDGER ELIZE LA BRIE.